United States Patent [19]

Pfeifer et al.

[11] 4,405,431
[45] Sep. 20, 1983

[54] APPARATUS FOR PARTIAL ELECTROLYTIC COATING OF INDIVIDUAL METAL PARTS

[75] Inventors: Alfred Pfeifer, Altenstadt; Rudolf Seif, Bruchkobel; Dietmar Holdt, Leinzell, all of Fed. Rep. of Germany

[73] Assignee: Degussa Aktiengesellschaft, Frankfurt, Fed. Rep. of Germany

[21] Appl. No.: 285,335

[22] Filed: Jul. 22, 1981

[30] Foreign Application Priority Data

Jul. 29, 1980 [DE] Fed. Rep. of Germany ....... 3028635

[51] Int. Cl.$^3$ .................. C25D 17/06; B05C 3/10; C25D 17/28
[52] U.S. Cl. .................. 204/202; 204/224 R; 204/297 R; 118/423
[58] Field of Search ............ 204/202, 224 R, 225, 204/297 R; 118/423, 503

[56] References Cited

U.S. PATENT DOCUMENTS

| | | | |
|---|---|---|---|
| 3,573,186 | 3/1971 | Ryerson et al. | 118/423 X |
| 4,032,414 | 6/1977 | Helder et al. | 204/202 X |
| 4,035,245 | 7/1977 | Danneels et al. | 204/202 X |
| 4,155,815 | 5/1979 | Francis et al. | 204/224 R X |

FOREIGN PATENT DOCUMENTS 50-8420  4/1975  Japan ............................. 204/202

*Primary Examiner*—Donald R. Valentine
*Attorney, Agent, or Firm*—Cushman, Darby & Cushman

[57] ABSTRACT

Apparatus is disclosed for partial electrolytic coating of individual metal parts, wherein a conveying chain, running over a pair of rolls, has individual holding elements joined together by pins. The holding elements have a contact cover plate and clamping cover plate with spacing means therebetween. Spring means is provided which is adapted for forcing the contact cover plate and clamping cover plate toward each other.

18 Claims, 4 Drawing Figures

APPARATUS FOR PARTIAL ELECTROLYTIC COATING OF INDIVIDUAL METAL PARTS

BACKGROUND OF THE INVENTION

The invention is directed to an apparatus for the partial, electrolytic coating of individual metallic parts, especially pins, switches and belts for electrical contacts, by partial immersion in a liquid bath, consisting essentially of an electrolyte tank, a conveyor chain for fastening and contacting the parts to be coated, a coating apparatus and a withdrawing apparatus.

Individual parts, especially pins for electrical contacts are generally partially coated (plated) electrolytically, especially gold plated, by arranging in a row on a conveyor device, contacting and immersing in an electrolytic bath. The electrolytic coating or plating takes place in this case up to the depth of immersion of the part in the bath. For the economical manufacture of such pins there is frequently resorted to so-called pin bars arranged in rows or synthetic conveyers.

The core problem in this process for partial coating consists in the contacting of the workpiece, especially if the coating should be in continuous operation, and because of economical pass through times which mean that it must be operated with maximum currents and bath temperatures.

There is already known from German OS No. 1796017 an electrolytic apparatus for the partial coating of such parts in which the workpieces hanging on contacting and conveying cars are led through the bath. The cars with the help of rollers are carried in a fixed cathode guide rail over the electrolytic tank which does not guarantee that there can be kept an exact depth of immersion of the parts to be coated. Besides contacting difficulties occur.

In German OS No. 2460694 there are described contacting and conveying cars with binding rods for receiving two rows of pin bars which are joined together by hinges for the formation of an endless conveying chain. With the help of rolls they are carried in a guide rail and contacted via carbon brushes with a cathode bar. Thereby the conveying chain is driven with the help of two polygonal wheels which are adjusted to the conveying cars. However, only two row binding rods can be coated on this apparatus, but not single-row binding pins, switches or belts.

Therefore, it was the problem of the present invention to make an apparatus for the partial electrolytic coating of individual metal parts, especially pins, switches and belts for electrical contacts, by partial immersion in a liquid bath consisting essentially of an electrolytic tank, a conveying chain for fastening and contacting the parts to be coated, a coating and withdrawing device which guarantees a constant depth of immersion in the liquid bath of the parts to be coated and also quarantees a reliable contacting.

SUMMARY OF THE INVENTION

This problem was solved according to the invention by making the conveying chain of individual holding elements which are directly joined together and in each case consist of a contact cover plate and a clamping cover plate whereby the clamping cover plate is positioned by means of a spacer away from the contact cover plate and is forced against the contact cover plate by means of a spring means.

DETAILED DESCRIPTION

Figure 1:
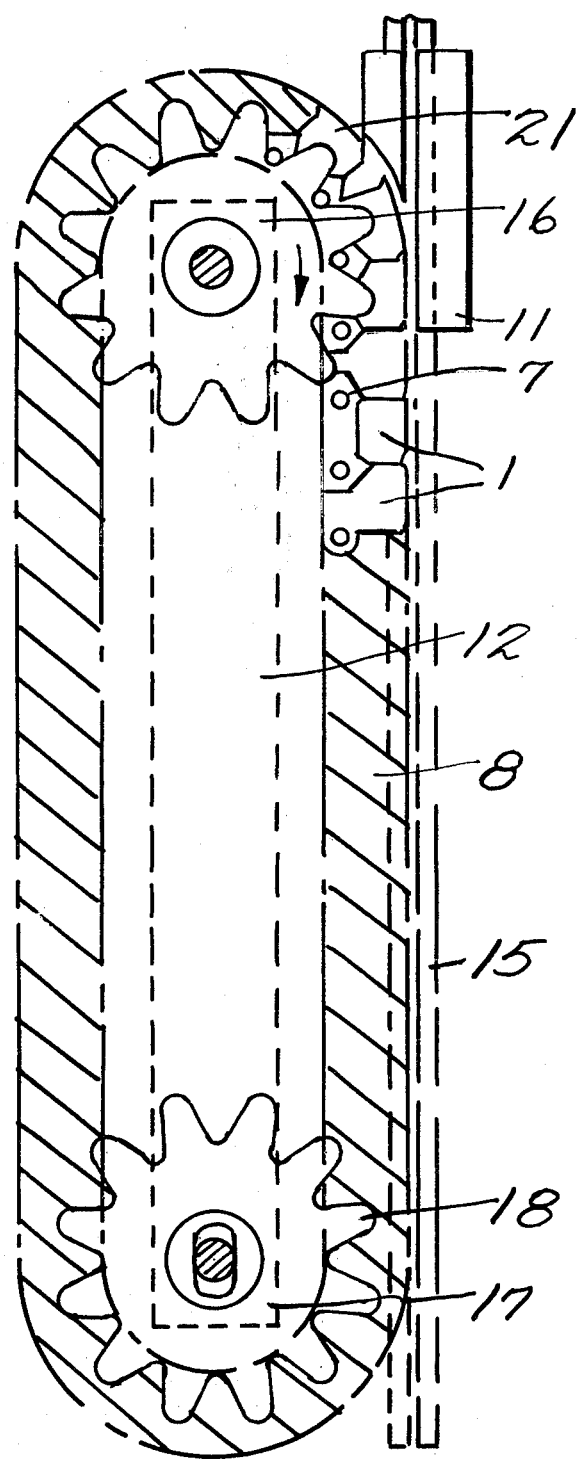
FIG. 1 is a schematic longitudinal section through the conveying chain.
Figure 2:
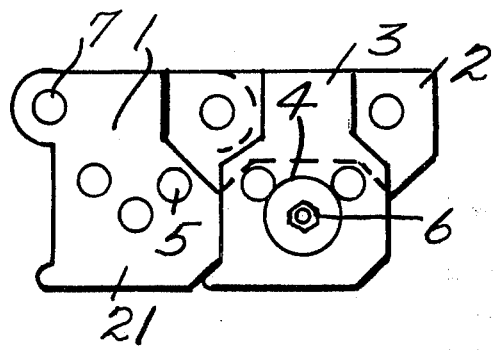
FIG. 2 is a cut with two chain members.
Figure 3:
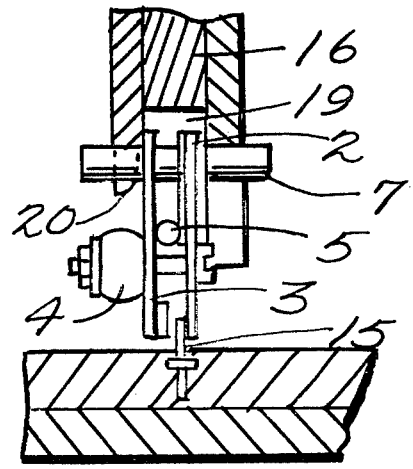
FIG. 3 is a cross section through a holding element in the open condition.
Figure 4:
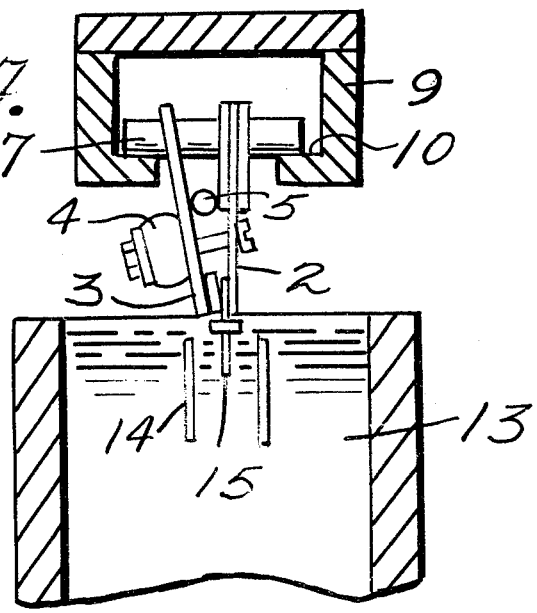
FIG. 4 is a cross section through a holding element in the closed condition.

Referring more specifically to the drawings where like numerals refer to like parts an essential component of the apparatus is the conveying chain 8 which consists of a series of holding elements 1 which are joined together via pins 7. The conveying chain 8 is carried over two conveying rolls 16 and 17, which in each case have a surrounding groove 19 and preferably are provided with teeth 18 for receiving the pins 7, the teeth defining the grooves 19. One side of the grooves 19 is constructed conically and thereby causes the opening and closing of the individual holding elements 1. A chain frame 12 is joined with the shaft of the conveying rolls 16 and 17 on which frame there is advantageously fitted a chain guide 9 which supports the pins 7 of the holding elements 1 and this safely prevents a sagging of the conveying chain 8. There can be placed in the chain guide 9 a contact bar 10 which causes the contacting of the holding elements 1 and therewith of the individual parts 15 to be coated. The contacting of course can also take place via the conveying rolls 16 and 17.

In each case the individual holding elements 1 consist of a contact cover plate 2 and a clamping cover plate 3, whereby the clamping cover plate 3 is positioned by a spacer 5, preferable balls, apart from the contact cover plate 2 and is forced toward the cover plate 2 by means of a spring element 4. The elastic force of the spring element 4 can advantageously be regulated by means of an adjusting bolt 6. In the running into the conveying roll 16 the clamping cover plate 3 is lifted up from the contact cover plate 2 by the conical side 20 of the groove 19 located in the roll 16 and can receive the parts 15 to be coated which are supplied via a loading device 11. After leaving the conveying roll 16 the clamping cover plate 3 is again pressed on the contact cover plate 2 by the spring element 4 so that the parts 15 are securely held and contacted. Then they move through the bath 13 between the anodes 14 and running into the groove 19 of the conveying roll 17 are again released and removed.

The gripping end 21 of the contact cover plate 2 and clamping cover plate 3 is preferably constructed in the shape of a diamond or rhomboid in order to also be able to securely contact workpieces of small size. Through this there arises no general pushing between holding elements 1 along the parts 15 to be coated or plated. A trapezoid angle of about 45° has proven good.

The entire disclosure of German priority application No. P 30 28 635.2 is hereby incorporated by reference.

What is claimed is:

1. An apparatus for the partial electrolytic coating of individual metal parts, especially pins, switches and belts for electrical contacts, consisting essentially of an electrolyte tank, a conveying chain means running over a pair of rolls for fastening and contacting the parts to be coated, means for loading and withdrawing the parts to be coated, said conveying chain means comprising individual holding elements which are joined directly together by pins, said holding elements comprising a contact cover plate and a clamping cover plate, means for spacing the clamping cover plate from the contact cover plate and spring means adopted to force the clamping cover plate toward the contact cover plate, said rolls being provided with a groove having a conically shaped side surrounding each roll.

2. An apparatus according to claim 1 wherein the spacing means is balls.

3. An apparatus according to claim 2 comprising adjusting bolt means for controlling the elastic force of the spring means.

4. An apparatus according to claim 1 wherein each of the rolls is provided with teeth for receiving the pins.

5. An apparatus according to claim 4 comprising adjusting bolt means for controlling the elastic force of the spring means.

6. An apparatus according to claim 5 wherein the contact cover plate and the clamping cover plate each has an end for gripping the pins, said gripping ends being of rhomboid shape.

7. An apparatus according to claim 4 including chain guide means.

8. An apparatus according to claim 7 wherein the contact cover plate and the clamping cover plate each has an end for gripping the pins, said gripping ends being of rhomboid shape.

9. An apparatus according to claim 4 wherein the contact cover plate and the clamping cover plate each has an end for gripping the pins, said gripping ends being of rhomboid shape.

10. An apparatus according to claim 1 comprising adjusting bolt means for controlling the elastic force of the spring means.

11. An apparatus according to claim 10 including chain guide means.

12. An apparatus according to claim 11 wherein the contact cover plate and the clamping cover plate each has an end for gripping the pins, said gripping ends being of rhomboid shape.

13. An apparatus according to claim 10 wherein the contact cover plate and the clamping cover plate each has an end for gripping the pins, said gripping ends being of rhomboid shape.

14. An apparatus according to claim 1 comprising adjusting bolt means for controlling the elastic force of the spring means.

15. An apparatus according to claim 1 including chain guide means.

16. An apparatus according to claim 15 wherein the contact cover plate and the clamping cover plate each has an end for gripping the pins, said gripping ends being of rhomboid shape.

17. An apparatus according to claim 1 wherein the contact cover plate and the clamping cover plate each has an end for gripping the pins, said gripping ends being of rhomboid shape.

18. An apparatus according to claim 1 wherein the contact cover plate and the clamping cover plate each has an end for gripping the pins, said gripping ends being of rhomboid shape.

* * * * *